Patented Apr. 7, 1936

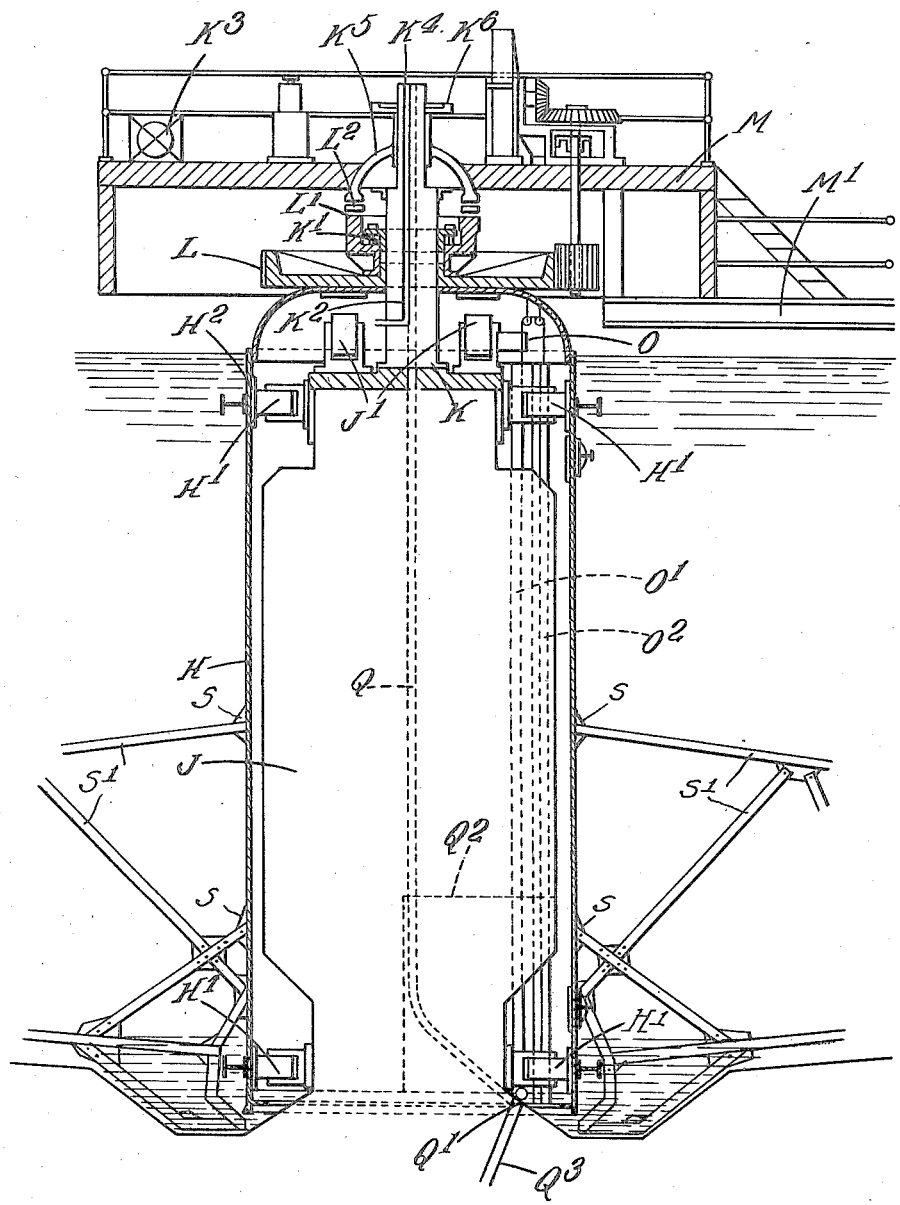

2,036,809

UNITED STATES PATENT OFFICE 2,036,809

SEDIMENTATION APPARATUS OR THICKENER

Edwin William Arnold Humphreys and Percy Harry Illingworth Humphreys, London, England Application April 26, 1935, Serial No. 18,286
In Great Britain February 3, 1934

14 Claims. (Cl. 210—55)

This invention relates to sedimentation basins or thickeners and similar apparatus such as is used for example for the purification of water, sewage treatment, separation of industrial waste, thickening substances containing liquids, wet treatment of metalliferous ores and slimes, treatment of cement slurries and whitening and chemical slurries, treatment of pigments, and for industrial recovery plants.

The basin is frequently provided with rotary sludge removing means comprising arms extending radially from the center of the basin into proximity with its periphery and carrying one or more blades arranged to move the sludge along the bottom of the basin to a sludge discharge opening. This discharge opening is preferably near the center of the basin where the liquid is at its lowest velocity. The outlet opening may comprise a circular collecting trench from which the settled matter or sludge is withdrawn either continuously or intermittently by discharge piping. It has been a practice to support such a rotary device by an overhead bridge spanning the basin or to support the device on a central pillar upstanding from the center of the basin. For large basins however the overhead bridge is a rather cumbersome structure and costly and with either form of support the weight of the rotating device will create frictional losses in the power required to rotate the device.

An object of the invention is to avoid supporting a heavy rotating device on such an overhead bridge or central pillar. According to an important feature of the invention the rotating device is supported partly or wholly by the buoyancy of an inverted drum which is arranged in the basin like a diving bell and on which the sludge raking means are mounted. The drum may be supplied with compressed air and the buoyancy of the drum may be more than sufficient to support the weight of the drum and the parts carried by it so that said drum will have an upward thrust which may be taken by a suitable bearing. Such an arrangement will avoid undue vertical movement of the drum and its vertical position may be varied if desired by adjusting the bearing vertically.

In order that the said invention may be clearly understood and readily carried into effect, the same will now be described more fully with reference to the accompanying drawing, which is a vertical sectional view illustrating apparatus at the center of the basin for supporting and rotating sludge raking means.

The inverted buoyancy drum H is preferably cylindrical and of sufficient capacity to float in the liquid when supporting the sludge raking arms and the other parts as may be desired. Fixed to the outside of the drum are brackets or cleats S to which the sludge raking arms $S^1$ are attached. The drum surrounds a pillar J of masonry or concrete which is built in the center of the basin and is so proportioned that it provides accommodation for two or more sets of rollers $H^1$ which are attached to the pillar and bear on circular rings or pads $H^2$ fixed to the inside of the drum H. The pillar J is also proportioned according to the amount of air required to be pumped into or allowed to escape out of the buoyancy drum. The pillar J carries rollers $J^1$ for supporting the drum if the air pressure should fail. The pillar J also supports a solid or hollow vertical shaft K which passes through the top of the drum H and through stuffing boxes $K^1$. The drum H can move up or down the shaft K without loss or leakage of air from the drum. The shaft K is provided with an air supply duct $K^2$ whereby air from an air compressor $K^3$ is supplied to the interior of the drum. The shaft K may be provided with a lubricating duct whereby lubricant can be supplied to the rollers within the drum H. The shaft K carries a threaded upward extension $K^4$ surrounded by a bearing ring $K^5$ adjustable by a hand wheel $K^6$ for varying the height of the sludge scraper arms above the floor of the basin by varying the upper limits to which the buoyancy of the drum may lift the platform M. The drum carries a spur gear L and above that a bearing ring $L^1$ between which and the ring $K^5$ are bearing rollers $L^2$. The spur gear L is driven through the gears shown from a motor which may be mounted on the usual platform M or which motor may be mounted at the edge of the basin and connected by a shafting along the walkway $M^1$ to the gears. An alternative method of adjusting the drum H vertically is by hydraulic jacks. If the rotating parts should cease to operate and subsequently require to be restarted the collection of sludge may be sufficient to prevent rotation of the sludge scraping or raking arms and by adjustment of the hand wheel $K^6$ or hydraulic jacks the drum and scraping arms can be lifted by the buoyancy tank to bring the arms above the sludge whereafter the drum and arms will be lowered slowly. The platform M may rest on the drum H or on the column J. If desired worm and worm wheel connections may be provided between the drum and the motor and the worm may be permitted to move relatively to the motor by a shaft fitted with universal couplings to allow for the vertical movements of the drum. The reduction gearing may be arranged adjacent to the motor at the edge of the basin if desired. The air compressor also may be at the edge of the basin. Means may be provided for starting the compressor when the pressure of air in the drum H falls below a predetermined minimum and for stopping the compressor when a desired maximum pressure is reached or the supply of air to the drum may be through a reducing valve, and a single compressor and container may be arranged to supply air to any number of such drums.

The drum and rake arms may be provided with usual electrical overload devices and with an indicating and/or recording ammeter. For protecting the rotating structure in the event of failure of buoyancy of the drum H a float switch O is provided having a float tube $O^1$ and counterweight tube $O^2$ for stopping the motor if the level of the liquid in the drum H rises above the level necessary to give the required upward lift.

Drain piping Q may be provided centrally through the column J and extensions K, $K^4$, which may have a fixed intake opening at $Q^1$ at the level of the liquid to be maintained in the drum H so as to draw off surplus oil from the top of the liquid and to provide escape for surplus air. Alternatively the column J may be slotted as at $Q^2$ and a telescopic or vertically adjustable pipe may be provided the lower end of which can be adjusted vertically in the slot $Q^2$ whereby the pressure in the drum H can be varied. The upper end of the drain pipe may be connected to a discharge at the edge of the basin. Samples of liquid or sludge may also be withdrawn by these means. The vertical pipe may if desired be supported on a counterweight by a pulley. The pipe may pass at its upper end through a suitable gland and project into a larger vertical pipe from which the discharge from the pipe can run out through a suitable faucet, tundish, and waste pipe. A rack and pinion mechanism provided with friction collars may be used in place of the counterweight for enabling the pipe to be adjusted vertically. As soon as the level of the liquid within the drum H falls until air enters the drain pipe some liquid or sludge including any waste oil will be discharged through the drain pipe together with the air until the pressure in the drum falls sufficiently to permit the liquid again to rise until the lower end of the pipe is closed. The drain may be continued as at $Q^3$ to a tunnel beneath the basin and in this arrangement a loaded relief valve will be provided in the pipe and adjusted so that a small amount of liquid or sludge together with any waste oil will be drawn off at the same time as the surplus air.

The basin may be circular, rectangular with rounded corners, or of other desired shape.

What we claim and desire to secure by Letters Patent of the United States is:—

1. A sedimentation or thickener basin comprising a platform extending from the periphery of the basin to the center thereof, a drum closed at its sides and which drum is closed at its top so as to hold air within it, said drum being immersed in the liquid in the basin with its axis vertical and which drum is capable by reason of its size to provide sufficient buoyancy for supporting one end of the platform and which drum is as deep as the basin and extends down to the average level of the bottom of the basin, bearing means within the drum and mounted on the drum, and a pillar upstanding from the basin co-operating with said bearing means for lateral positioning of the drum.

2. A sedimentation or thickener basin comprising a platform adapted to extend from the periphery of the basin to the center thereof, a drum closed at its sides and which drum is closed at its top so as to hold air within it, said drum being immersed in the liquid in the basin with its axis vertical and which drum is capable by reason of its size to provide sufficient buoyancy for supporting one end of the platform and which drum is as deep as the basin and extends down to the average level of the bottom of the basin, bearing means within the drum and mounted on the drum, a pillar upstanding from the basin and co-operating with said bearing means for lateral positioning of the drum, and bearing means for mounting one end of the platform on the rotating drum.

3. A sedimentation or thickener basin comprising a drum closed at its sides and which drum is closed at its top when the complete apparatus is assembled so as to hold air within it, said drum being immersed in the liquid in the basin with its axis vertical and which drum is capable by reason of its size to provide sufficient buoyancy for supporting one end of the usual platform and which drum is as deep as the basin and extends down to the average level of the bottom of the basin, bearing means within the drum and mounted on the drum near the top thereof, other bearing means within the drum and near the bottom thereof and mounted on the drum, and a pillar upstanding from the bottom of the basin and co-operating with both said bearing means for lateral positioning of the drum.

4. A sedimentation or thickener basin comprising a platform extending from the periphery of the basin to the center thereof, a drum closed at its sides and which drum is closed at its top when the complete apparatus is assembled so as to hold air within it, the drum being immersed in the liquid in the basin with its axis vertical and which drum is capable by reason of its size to provide sufficient buoyancy for supporting one end of the platform and which drum is as deep as the basin and extends down to the average level of the bottom of the basin, bearing means within the drum and mounted on the drum, a pillar upstanding from the basin and co-operating with said bearing means for lateral positioning of the drum, and means for supplying compressed air into the interior of the drum.

5. A sedimentation or thickener basin comprising a rotary scraper device, a drum closed at its sides and which drum is closed at its top when the complete apparatus is assembled so as to hold air within it, the drum being immersed in the liquid in the basin with its axis vertical and which drum is capable by reason of its size to provide sufficient buoyancy for carrying said rotary scraper device and which drum is as deep as the basin and extends down to the level of the scraping surfaces of the scraper device, bearing means within the drum and mounted on the drum and a pillar upstanding from the basin and co-operating with said bearing means for lateral positioning of the drum.

6. A sedimentation or thickener basin comprising a rotary scraper device, a drum closed at its sides and which drum is closed at its top when the complete apparatus is assembled so as to hold air within it, the drum being immersed in the liquid in the basin with its axis vertical and which drum is capable by reason of its size to provide sufficient buoyancy for carrying said rotary scraper device and which drum is as deep as the basin and extends down to the level of the scraping surfaces of the scraper device, bearing means within the drum and mounted on the drum, a pillar upstanding from the basin and co-operating with the bearing means for lateral positioning of the drum, and means on the drum which is adapted to be driven and in turn rotates the drum.

7. A sedimentation or thickener basin comprising a rotary scraper device, a drum closed at its sides and which drum is closed at its top when the complete apparatus is assembled so as to hold air within it, the drum being immersed in the liquid in the basin with its axis vertical and which drum is capable by reason of its size to provide sufficient buoyancy for carrying said rotary scraper device and which drum is as deep as the basin and extends down to the level of the scraping surfaces of the scraper device, bearing means within the drum and mounted on the drum near the top thereof, other bearing means within the drum and mounted on the drum near the bottom thereof and a pillar upstanding from the bottom of the drum and co-operating with both bearing means for lateral positioning of the drum.

8. A sedimentation or thickener basin comprising a platform extending from the periphery of the basin to the center thereof, a drum closed at its sides and which drum is closed at its top when the complete apparatus is assembled so as to hold air within it, the drum being immersed in the liquid in the basin with its axis vertical and which drum is capable by reason of its size to provide sufficient buoyancy for supporting one end of the platform and which drum is as deep as the basin and extends down to the average level of the bottom of the basin, a pillar upstanding from the bottom of the basin, bearing means within the drum and mounted on the drum near the top thereof and co-operating with the said pillar for lateral positioning of the drum, means on the drum which is adapted to be driven and in turn rotates the drum, bearing means for supporting one end of the platform on the rotating drum, other bearing means mounted on the drum near the bottom of the drum also for co-operating with said pillar, and means for supplying compressed air into the interior of the drum.

9. A sedimentation or thickener basin comprising a large drum closed at its sides and top so as to hold air within it when immersed in the liquid in the basin and which drum is almost wholly immersed in the liquid and has its axis disposed vertically, an upstanding central structure in the basin which enters the interior of the drum and co-operates with the drum to position it, a rotary scraper device fixed to the drum, means for rotating the drum and scraper device, the buoyancy due to the air trapped in the drum being utilized in supporting the weight of the drum and scraper device, and a bearing carried by said structure and adapted to receive upward pressure from the drum, the said drum being arranged so that the buoyancy due to the air trapped within it is great enough not only to support the weight of the drum and scraper device but also to exert an upward pressure on said bearing.

10. A sedimentation or thickener basin comprising a large drum closed at its sides and top so as to hold air within it when immersed in the liquid in the basin and which drum is almost wholly immersed in the liquid and has its axis disposed vertically, an upstanding central structure in the basin which enters the interior of the drum and co-operates with the drum to position it, a rotary scraper device fixed to the drum, means for rotating the drum and scraper device, the buoyancy due to the air trapped in the drum being utilized in supporting the weight of the drum and scraper device, and means for maintaining the interior of the drum supplied with compressed gas for maintaining the buoyancy of the drum.

11. A sedimentation or thickener basin comprising a large drum closed at its sides and top so as to hold air within it when immersed in the liquid in the basin and which drum is almost wholly immersed in the liquid and has its axis disposed vertically, an upstanding central structure in the basin which enters the interior of the drum and co-operates with the drum to position it, a rotary scraper device fixed to the drum, means for rotating the drum and scraper device, the buoyancy due to the air trapped in the drum being utilized in supporting the weight of the drum and scraper device, a bearing carried on said structure and adapted to receive upward pressure from the drum, the drum being arranged so that the buoyancy due to the air trapped within it is great enough not only to support the weight of the drum and scraper device but also to exert an upward pressure on said bearing, and means for adjusting the height of said bearing whereby the height to which the drum can rise under the buoyancy of the air trapped in it is also adjusted.

12. A sedimentation or thickener basin comprising a large drum closed at its sides and top so as to hold air within it when immersed in the liquid in the basin and which drum is almost wholly immersed in the liquid and has its axis disposed vertically, an upstanding central structure in the basin which enters the interior of the drum and co-operates with the drum to position it, a rotary scraper device fixed to the drum, means for rotating the drum and scraper device, the buoyancy due to the air trapped in the drum being utilized in supporting the weight of the drum and scraper device, means for rotating the drum, and other means for automatically stopping the drum from being rotated in the event of failure of buoyancy of the drum.

13. A sedimentation or thickener basin comprising a large drum closed at its sides and top so as to hold air within it when immersed in the liquid in the basin and which drum is almost wholly immersed in the liquid and has its axis disposed vertically, an upstanding central structure in the basin which enters the interior of the drum and co-operates with the drum to position it, a rotary scraper device fixed to the drum, and means for rotating the drum and scraper device, the buoyancy due to the air trapped in the drum being utilized in supporting the weight of the drum and scraper device, and drain piping provided through the said structure and having its lower intake opening at about the level of the liquid to be maintained in the drum.

14. A sedimentation or thickener basin comprising a large drum closed at its sides and top so as to hold air within it when immersed in the liquid in the basin and which drum is almost wholly immersed in the liquid and has its axis disposed vertically, an upstanding central structure in the basin which enters the interior of the drum and co-operates with the drum to position it, a rotary scraper device fixed to the drum, means for rotating the drum and scraper device, the buoyancy due to the air trapped in the drum being utilized in supporting the weight of the drum and scraper device, drain piping provided through the structure and having its lower intake opening at about the level of the liquid to be maintained in the drum, and wherein the intake end is adjustable for adjusting the height of the liquid in the drum and the pressure of the compressed gas in the drum.

EDWIN WILLIAM ARNOLD HUMPHREYS.
PERCY HARRY ILLINGWORTH HUMPHREYS.